United States Patent
Chen

(10) Patent No.: US 10,278,364 B2
(45) Date of Patent: May 7, 2019

(54) PET COMB WITH ELASTIC HANDLE

(71) Applicant: Cheng Lang Chen, Taichung (TW)

(72) Inventor: Cheng Lang Chen, Taichung (TW)

( * ) Notice: Subject to any disclaimer, the term of this patent is extended or adjusted under 35 U.S.C. 154(b) by 171 days.

(21) Appl. No.: 15/632,410

(22) Filed: Jun. 26, 2017

(65) Prior Publication Data
US 2018/0000044 A1 Jan. 4, 2018

(30) Foreign Application Priority Data

Jun. 29, 2016 (CN) ..................... 2016 2 0661970 U

(51) Int. Cl.
*A01K 13/00* (2006.01)
*A46B 5/00* (2006.01)
*A46B 5/02* (2006.01)

(52) U.S. Cl.
CPC .......... *A01K 13/002* (2013.01); *A46B 5/0062* (2013.01); *A46B 5/02* (2013.01); *A46B 2200/1093* (2013.01)

(58) Field of Classification Search
CPC ........ A01K 13/002; A46B 5/007; A46B 5/06; A46B 5/0062; A46B 5/0066; A46B 2200/1093
See application file for complete search history.

(56) References Cited

U.S. PATENT DOCUMENTS

| | | | | |
|---|---|---|---|---|
| 416,545 A * | 12/1889 | Bartlett | ................ | A01K 13/002 119/631 |
| 594,218 A * | 11/1897 | Tombaugh | ........... | A01K 13/002 119/613 |
| 674,306 A * | 5/1901 | Peters | ................... | A01K 13/002 119/625 |
| 1,078,451 A * | 11/1913 | Minich | ................. | A01K 13/002 119/628 |
| 1,226,757 A * | 5/1917 | Duerr | .................... | A01K 13/002 119/628 |
| 2008/0078333 A1* | 4/2008 | Wang | .................... | A01K 13/002 119/611 |
| 2011/0119849 A1* | 5/2011 | Wang | .............................. | 15/171 |

* cited by examiner

*Primary Examiner* — Daniel J Colilla

(57) ABSTRACT

A pet comb generally includes a comb plate and a handle. The comb plate is provided with a plurality of comb strips at its front surface and a base portion at its rear surface. The handle is constructed of a spring element, which is attached with a connection portion and an enlarged main grip portion at two opposite ends thereof, and a covering, which has a concave neck portion formed integrally with the spring element, such that the enlarged main grip portion abuts on a rear end of the concave neck portion. The connection portion of the handle is fixedly attached to the base portion of the comb plate, such that the handle is at a predetermined angle to the comb plate. As such, the comb plate together with the comb strips can be easily operated by the handle to groom a pet.

10 Claims, 5 Drawing Sheets

PET COMB WITH ELASTIC HANDLE

(a) TECHNICAL FIELD OF THE INVENTION

The present invention relates to a pet comb with an elastic handle and, more particularly, to a pet comb including a handle provided with a spring element and a concave neck portion formed integrally with the spring element to allow the pet comb to be operated more smoothly and conveniently.

(b) DESCRIPTION OF THE PRIOR ART

For modern people, keeping pets is an increasingly popular way that can adjust the body and mind and increase family fun. For keeping pets good, a suitable comb is required. In addition to keeping the environment clean, combing the fur or hair of a pet can remove dead hair from the pet's skin to stimulate the growth of new hair, so that the incidence of skin diseases on the pet can be reduced.

Conventional pet combs are commonly designed to have rigid handles, through which users can operate the combs to groom pets. However, the variable body curve of a pet usually causes inconvenience of operating conventional pet combs. For operating conventional pet combs, the posture of the user should be adjusted frequently to have the combs in proper contact with a pet. Furthermore, the handles of conventional pet combs cannot be held properly by users, and thus the combs are liable to slip off the hands of users.

In view of the foregoing, there is a need to develop an ergonomic pet comb to solve the disadvantages of conventional pet comb.

SUMMARY OF THE INVENTION

One object of the present invention is to provide a pet comb, which is designed ergonomically to solve the problems of conventional pet combs.

The pet comb of the present invention generally comprises a comb plate provided with a plurality of comb strips thereon, and a handle fixedly attached to the comb plate. The technical means to solve the problems of conventional pet combs includes: the handle is constructed of a spring element attached with a connection portion at its front end and an enlarged main grip portion at its rear end, and a covering formed integrally with the spring element, wherein the covering is formed into a concave neck portion abutting on the enlarged main grip portion; the handle is fixedly attached to the comb plate by the connection portion thereof such that the handle is at a predetermined angle to the comb plate. As a result, the handle can be firmly held by a user, and the comb plate together with the comb strips can be easily operated by the handle to groom a pet.

In use, since the angle between the comb plate and the handle changes as the comb is operated to move along the body curve of a pet in a grooming operation, there is no need to change the combing angle of the pet comb or the posture of the user. The comb plate of the pet comb can easily follow the body curve of the pet to have the comb strips in proper contact with the body of the pet without causing the pet to feel uncomfortable. These features render the pet comb of the present invention to be an ergonomic design.

Other objects, advantages, and novel features of the present invention will become more apparent from the following detailed description when taken in conjunction with the accompanying drawings.

DETAILED DESCRIPTION OF THE PREFERRED EMBODIMENTS

Preferred embodiments are provided in the following paragraphs with reference to the accompanying drawings for illustrating the technical features of the present invention, but not for limiting the scope of the present invention.

Figure 1:
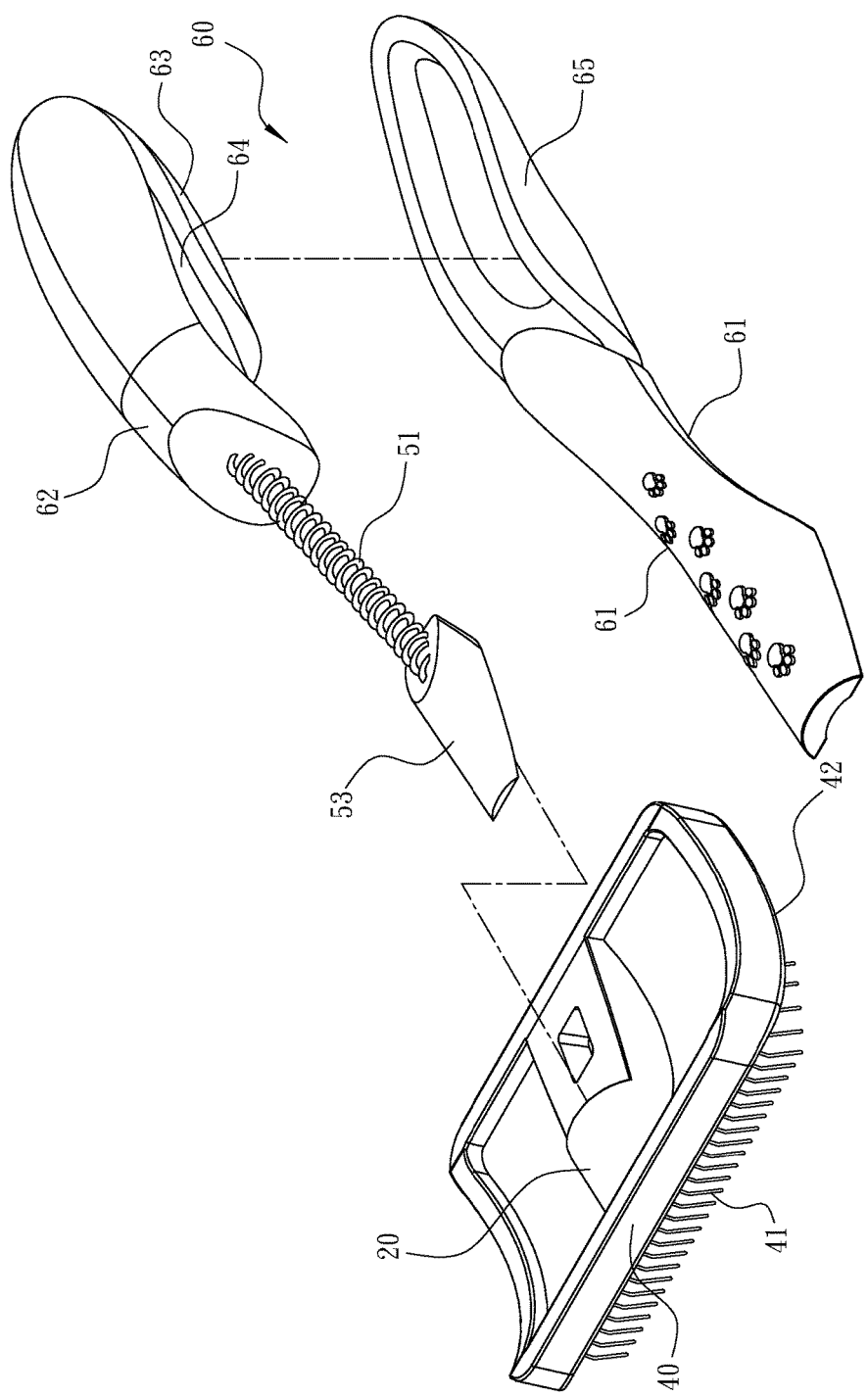
FIG. 1 shows a schematic makeup of a pet comb according to one embodiment of the present invention.
Figure 2:
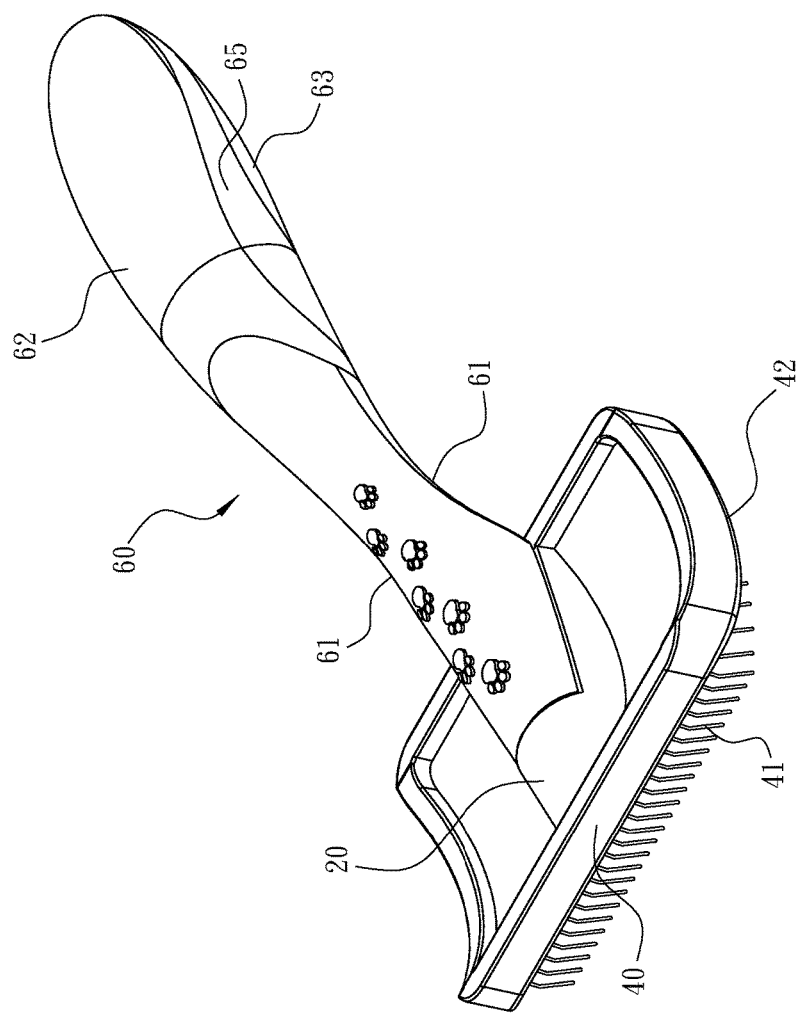
FIG. 2 shows a 3-dimensional view of the pet comb of the embodiment of the present invention.
Figure 3:
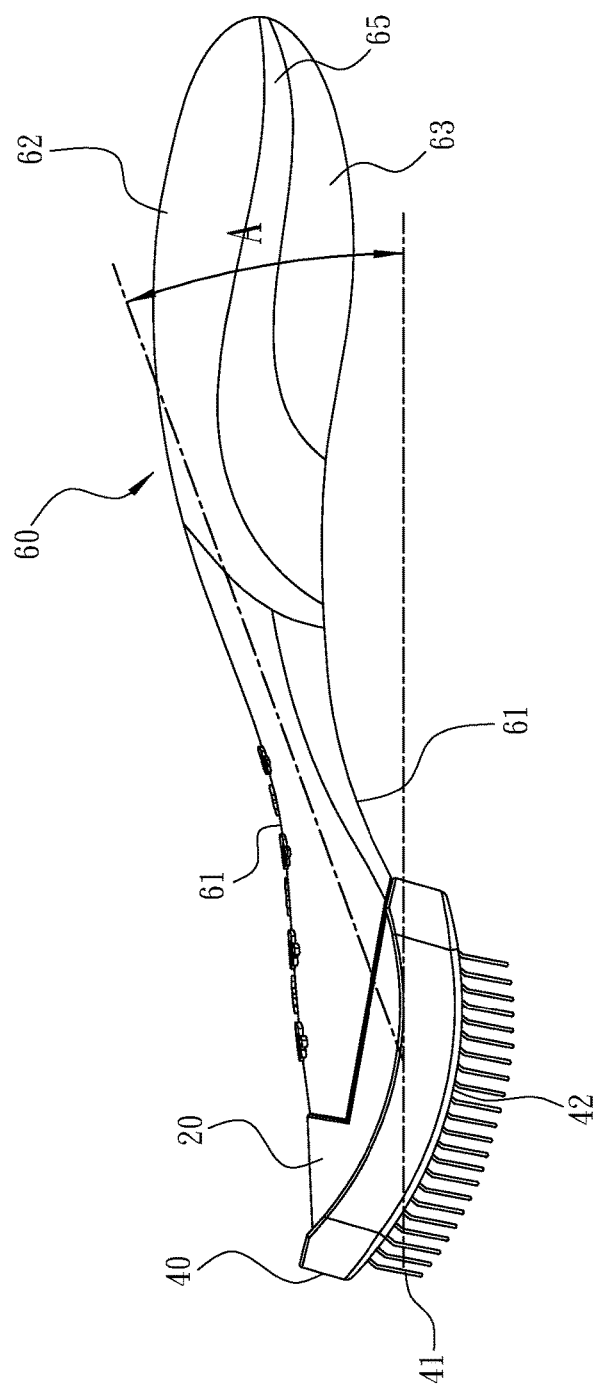
FIG. 3 shows a side view of the pet comb of the embodiment of the present invention, wherein the handle is located at a predetermined angle (A) to the comb plate when the pet comb is not in use.

Referring to FIGS. 1, 2 and 3, a pet comb according to one embodiment of the present invention is shown, which generally comprises a comb plate 40 and a handle 60. The comb plate 40, which is curved forwardly (i.e., the curvature center is behind the plate), has a front surface 42 on which a plurality of comb strips 41 are provided for brushing a pet's fur or hair. Also, the comb plate 40 is provided with a base portion 20 at its rear surface opposite to the front surface 42. The handle 60 is generally constructed of a spring element 51 and a covering formed into a concave neck portion 61 (which is a portion defining a circumferential recess) and an elongated ring portion 65 extending rearwardly from the concave neck portion 61. The spring element 51, which can be made from metallic or non-metallic material, is fixedly attached with a connection portion 53 at one end thereof and a main grip portion 62 at an opposite end thereof. The main grip portion 62, which is substantially round in cross section, defines a substantially annular groove 64, which generally divides the grip portion 62 into an upper halve (not labeled) and a lower half 63. In this embodiment, the spring element 51 is in the form of a metal coil spring. The connection portion 53 and the main grip portion 62, which are respectively attached at two opposite ends of the spring element 51, can be made of hard plastic, such as polypropylene (PP). The covering, including the concave neck portion 61 and the elongated ring portion 65, can be made of elastomer, such as rubber. The concave neck portion 61 is integrally formed around the connection portion 53 and the spring element 51. The elongated ring portion 65 is integrally formed along the substantially annular groove 64 of the main grip portion 62, such that the main grip portion 62 abuts on the rear end of the concave neck portion 61 of the covering and gradually increases in cross section in a direction opposite to the concave neck portion 61 of the covering till a maximum cross section being achieved and gradually decreases in cross section thereafter. As an example, the covering can be formed integrally with the spring element 51, the connection portion 53, and the main grip portion 62 by injection molding. Furthermore, the handle 60 is located at a predetermined angle (A) to the comb plate 40 when the pet comb is not in use. Specifically, as shown in FIG. 3, the angle (A) between the handle 60 and the comb plate 40 is measured between a line passing through the base portion 20 of the comb plate 40 and the main grip portion 62, and a reference plane, on which the comb plate 40 is substantially located. Preferably, the angle (A) between the handle 60 and the comb plate 40 ranges from 15 to 45 degrees. The connection portion 53 can be fixedly attached to the base portion 20 of the comb plate 40 by using glue.

Figure 4:
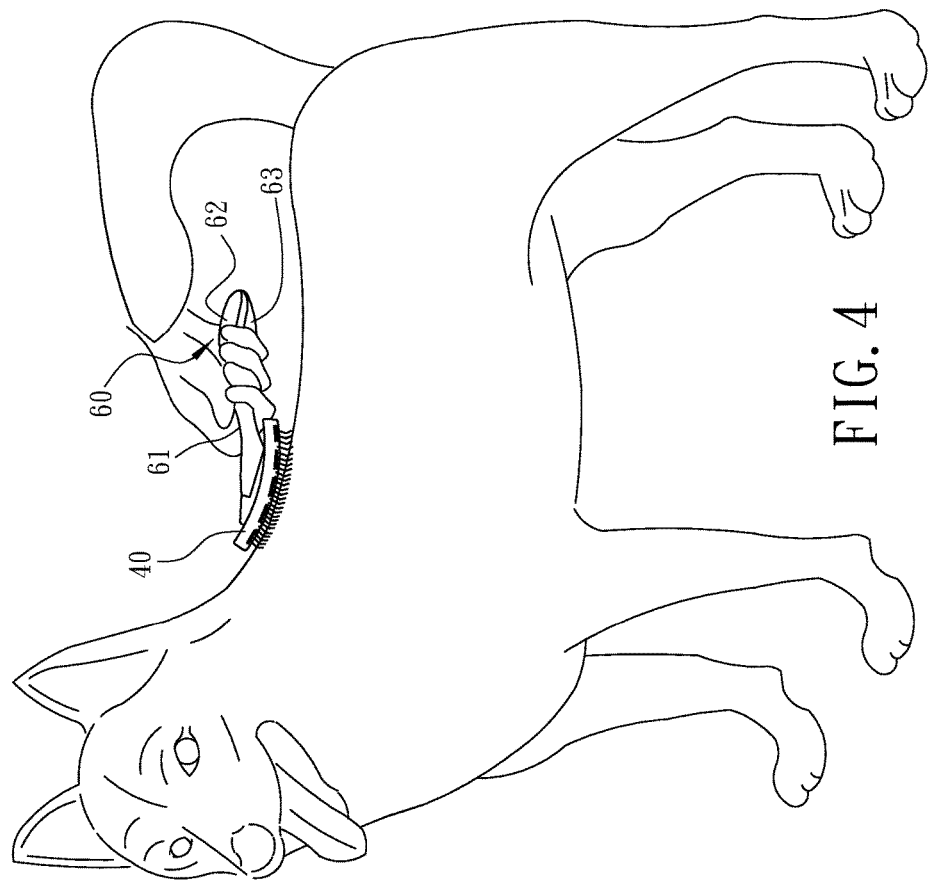
FIG. 4 shows a schematically working view of the pet comb of the embodiment of the present invention.

As shown in FIGS. 3 and 4, the circumferential recess of the concave neck portion 61 of the handle 60 facilitates a user to locate the forefinger and thumb of a user's hand on the handle 60; the enlarged round grip portion 62 facilitates the other fingers of the user's hand to hold the handle 60, so that the handle 60 can be tightly received into the purlicue (i.e., the space between forefinger and thumb) of the user's hand. The spring element 51 allows the angle between the handle 60 and the comb plate 40 to be changed as the pet comb is operated to move along the body curve of a pet in a grooming operation. Thus, in use, the comb plate 40 can easily follow the body curve of the pet to have the comb strips 41 in proper contact with the body of the pet, so that the fur or hair of the pet can be combed or brushed more easily without causing the pet to feel uncomfortable. During the combing operation, there is no need to adjust the combing angle of the pet comb or to change the posture of the user to have the comb plate 40 follow the body curve of the pet. The elastic handle 60 allows the comb plate 40 together with the comb strips 41 to move easily in multiple directions. For example, the pet comb can be operated to swing up and down, or to swing right and left. In one alternative embodiment, the comb plate 40 can be made in the form of a brush or a scrapper for beauty purpose.

Figure 5:
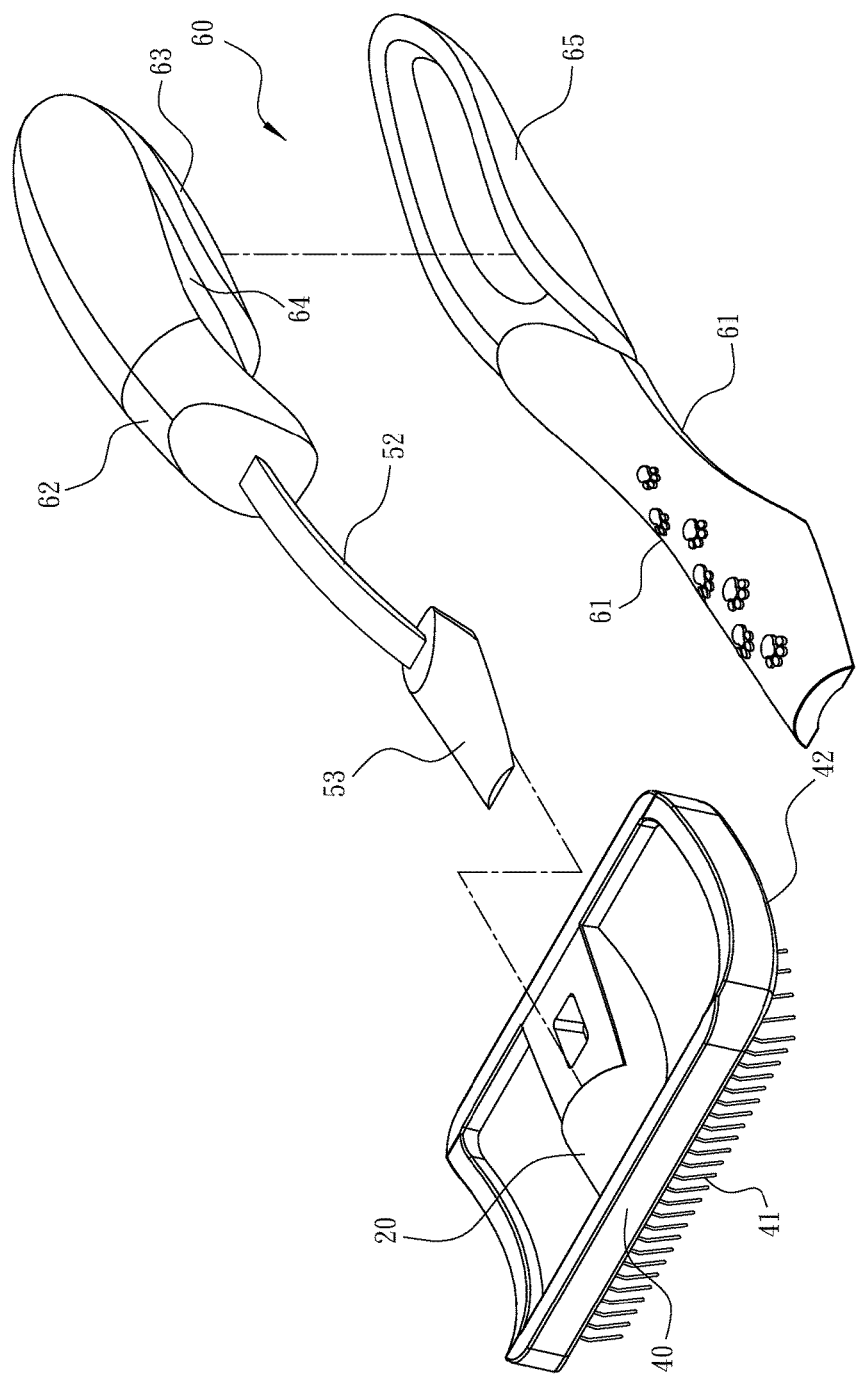
FIG. 5 shows a schematic makeup of a pet comb according to another embodiment of the present invention.

FIG. 5 shows another embodiment of the present invention, which generally comprises a comb plate 40 and a handle 60 provided therein with a spring element 52 that is in the form of a metal leaf spring. The structure of this embodiment is same as that of the previous embodiment except for the spring element. Thus, a detailed description for this embodiment is omitted herein. Similar to the previous embodiment, the spring element 52 provided in the handle 60 and the circumferential recess defined on the neck portion 61 of the handle 60 allow the pet comb to be operated more smoothly and conveniently These features render the pet comb of the present invention to be an ergonomic design.

Although the present invention has been described with a certain degree of particularity, it is understood that the present disclosure is made by way of example only and the combination and arrangement of parts may be resorted to without departing from the spirit and scope of the invention hereinafter claimed.

What is claimed is:

1. A pet comb, comprising:
   a comb plate, which is curved forwardly and provided with a plurality of comb strips at a front surface thereof for brushing a pet's fur or hair and provided with a base portion at a rear surface thereof; and
   a handle constructed of a spring element and a covering formed into a concave neck portion, the spring element being fixedly attached with a connection portion at one end thereof and a main grip portion at an opposite end thereof, the covering is made of elastomer, the concave neck portion of the covering being integrally formed around the connection portion and the spring element, such that the main grip portion abuts on a rear end of the concave neck portion of the covering and gradually increases in cross dimension in a direction opposite to the concave neck portion of the covering till a maximum cross section being achieved and gradually decreases in cross dimension thereafter, the connection portion of the handle being fixedly attached to the base portion of the comb plate, whereby the comb plate together with the comb strips can be easily operated by the handle to groom a pet.

2. The pet comb of claim 1, wherein the spring element is in the form of a metal coil spring.

3. The pet comb of claim 1, wherein the spring element is in the form of a metal leaf spring.

4. The pet comb of claim 1, wherein the connection portion and the main grip portion are made of hard plastic.

5. The pet comb of claim 1, wherein the covering is formed integrally with the spring element and the connection portion and the main grip portion by injection molding.

6. The pet comb of claim 1, wherein the handle is located at a predetermined angle to the comb plate when the pet comb is not in use.

7. The pet comb of claim 1, wherein the concave neck portion of the handle allows the forefinger and thumb of a user's hand to hold, and the main grip portion of the handle allows the other fingers of the user's hand to hold, whereby the handle can be tightly received into the purlicue of the user's hand.

8. The pet comb of claim 1, wherein the connection portion of the handle is fixedly attached to the base portion of the comb plate by using glue.

9. The pet comb of claim 1, wherein the main grip portion defines a substantially annular groove such that the main grip portion is divided into an upper half and a lower half; the covering is further formed into an elongated ring portion which extends rearwardly from the concave neck portion and is integrally formed along the substantially annular groove of the main grip portion.

10. The pet comb of claim 6, wherein the predetermined angle between the handle and the comb plate ranges from 15 to 45 degrees.

* * * * *